INVENTOR.
BRUCE B. LATTER
& WILLIAM C. BODONG

BY *Walter E. Rule*

THEIR ATTORNEY

July 21, 1959 B. B. LATTER ET AL 2,895,781
SAFETY THROWOUT MECHANISM FOR POWER OPERATED DRAWERS
Filed Oct. 24, 1958 3 Sheets-Sheet 2
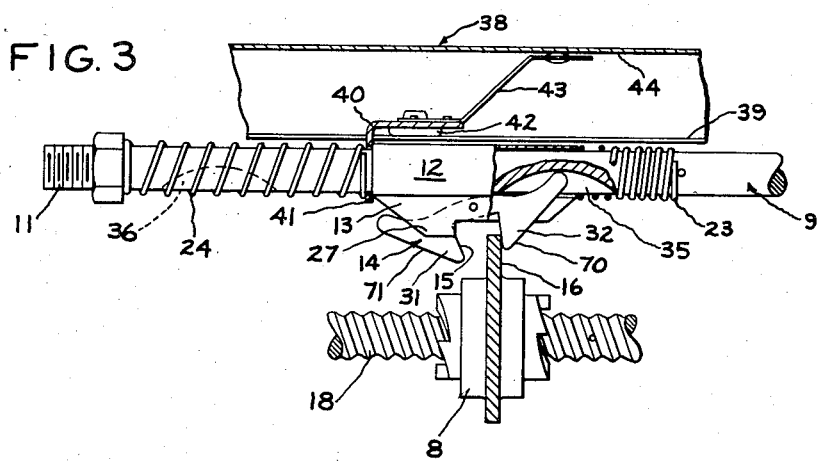
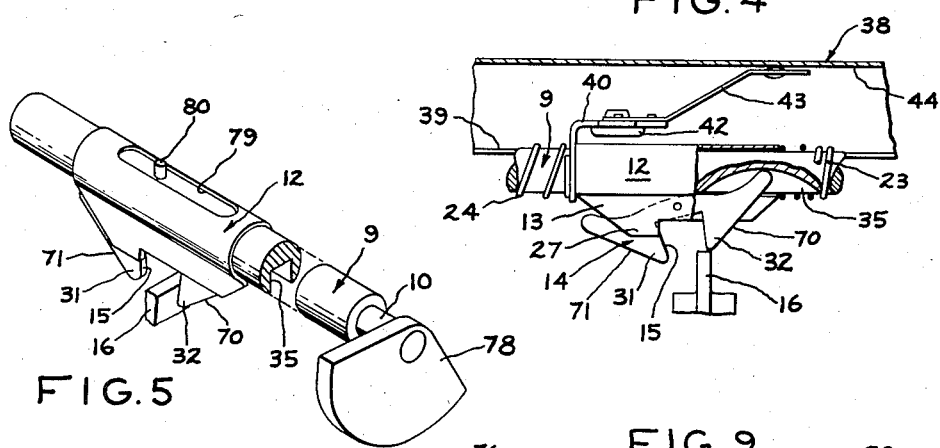
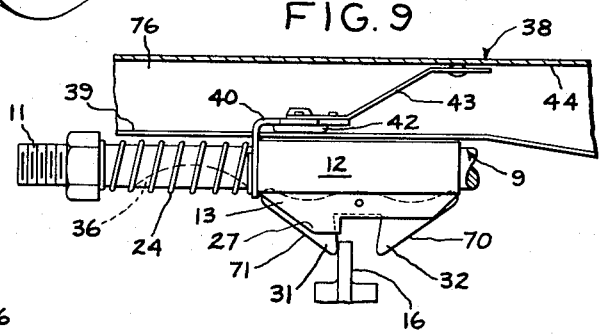
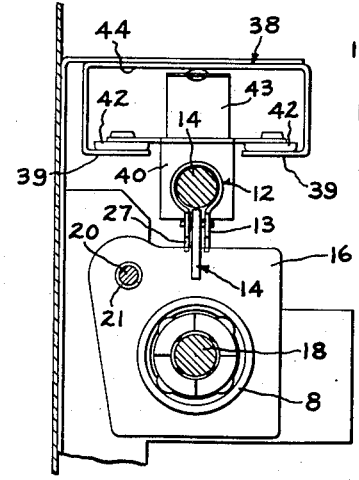
INVENTOR.
BRUCE B. LATTER
& WILLIAM C. BODONG
BY *Walter E. Pule*
THEIR ATTORNEY INVENTOR.
BRUCE B. LATTER
& WILLIAM C. BODONG
BY Walter E. Hale
THEIR ATTORNEY United States Patent Office 2,895,781
Patented July 21, 1959

2,895,781

SAFETY THROWOUT MECHANISM FOR POWER OPERATED DRAWERS

Bruce B. Latter and William C. Bodong, Louisville, Ky., assignors to General Electric Company, a corporation of New York Application October 24, 1958, Serial No. 769,377

9 Claims. (Cl. 312—223)

The present invention relates to power operated drawers and is more particularly concerned with a power drive mechanism for drawers including drive disconnect means for disconnecting the drive mechanism under predetermined operating conditions.

In power actuated mechanism for the operation of drawers and the like, it is highly desirable to provide an automatic safety device which will disconnect the power mechanism and stop the drawer travel either to prevent damage to the mechanism or injury to operating personnel, as for example, when the operator's hand becomes caught between the drawer and the cabinet front during closing of the drawer. In the case of relatively heavy drawers, such as freezer drawers of the type employed in household or domestic refrigerators, the problem of providing a load responsive safety device which will limit the applied door closing force to a safe value as the drawer approaches its closed position is complicated by the fact that this safe limiting force is often less than the force required to overcome the inertia and unlatching forces necessary to start the drawer in motion.

The present invention has as its principal object the provision of power drawer actuating means including improved load responsive means for automatically disengaging the power drive from the drawer when the driving force exceeds a preset limit.

Another object of the present invention is to provide a safety throw-out mechanism for a power actuated drawer so constructed and arranged that safety release of the mechanism will be effected at a relatively low driving force element during the latter portion of the closing travel of the drawer or in other words during the portion of the drawer travel when an operator's hand may be in a position to be caught between the drawer front and the adjacent cabinet face.

A more specific object of the invention is to provide a safety throw out mechanism for a power actuated drawer designed to disconnect the driving means from the drawer at a predetermined maximum load limit during most of the drawer travel and at a lower load as the drawer moves towards its closed position.

A further object of the present invention is to provide a safety throwout drawer actuating power mechanism including means for permitting manual operation of the drawer.

Further objects and advantages of the present invention will become apparent as the following description proceeds and the features of novelty which characterize the invention will be pointed out with particularity in the claims annexed to and forming a part of this specification.

In carrying out the objects of the present invention, there is provided a powered drive member and driving means for moving the drive member in a path parallel to the line of travel of a drawer. A rod having one end connected to the drawer and the other end extending into the cabinet and a connecting element slidably carried on the inner end of the rod provide driven means for connecting the drawer to the drive member. Spring means are provided which normally maintain the connecting element in a first or driving position on the rod but to permit the element to move under a predetermined drive force limit to a second position in which the connecting element and its supporting structure are so designed that the element will disengage the drive member. Preferably the driven means is designed so that this disengagement takes place at a first predetermined load limit during movement of the drawer from a closed to an open position and at a second and lower load limit during the latter stages of movement of the drawer from an open to a closed position during which period there is the greatest possibility for injury to an operator.

For a better understanding of the invention reference may be had to the accompanying drawing in which:

Fig. 3 is a view illustrating one step in the disconnect operation of the mechanism under drawer opening over load conditions;

Fig. 4 is a view similar to Fig. 3 disclosing the second step in the disconnect operation of the mechanism;

Fig. 5 is a view illustrating construction details of the driven portion of the mechanism;

Fig. 6 is a view generally along line 6—6 of Fig. 2;

Fig. 9 is a view illustrating the disconnect operation of the mechanism during closing of the drawer.

Figure 1:
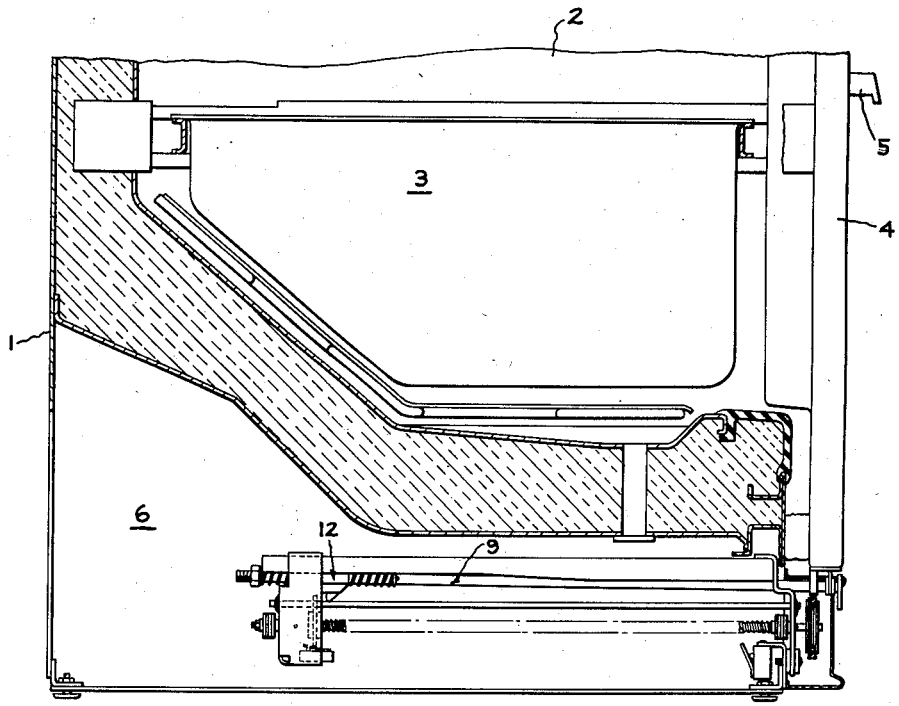
Fig. 1 is a sectional view of a portion of a freezer cabinet including a power operated drawer embodying the present invention.

For the purpose of illustrating the present invention there is shown in Fig. 1 of the drawing a freezer cabinet 1 including a freezer compartment 2 and a drawer 3 slidably supported within the compartment 2, the drawer having a front wall 4 which closes the access opening to the compartment 2. A handle 5 provided on the drawer front 4 provides means for normal operation of the drawer.

Figure 2:
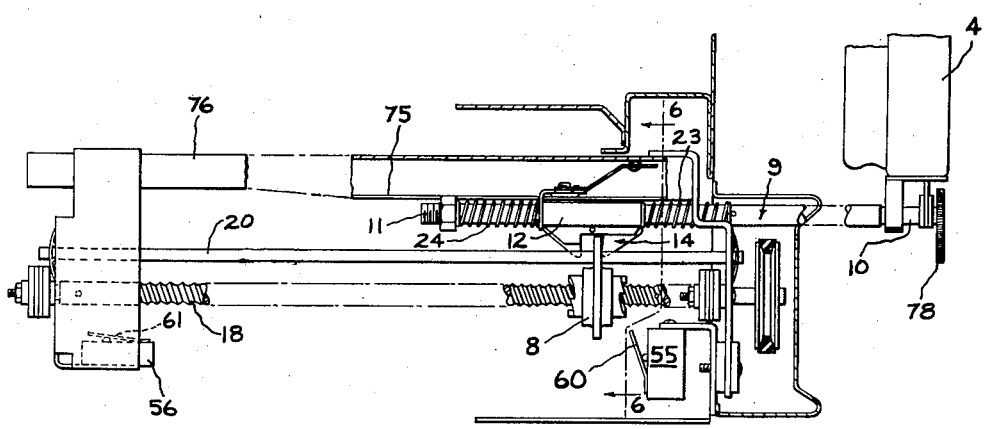
Fig. 2 is an enlarged view of the drawer operating mechanism shown in Fig. 1 with the drawer in an open position.

Disposed generally within the machinery compartment 6 of the cabinet and below and outside the freezing compartment 2, there is provided a motor operated drawer actuating mechanism for opening and closing the drawer 3. This mechanism comprises a drive member 8 (Fig. 2) arranged to move linearly along a path paralleling the line of travel of the drawer. The drive member 8 operates the drawer through driven means including a rod 9 having its forward end 10 connected to the drawer front 4 and its opposite or rear end 11 extending into the machinery compartment of the cabinet, the rod 9 being arranged substantially parallel to the line of travel of the drive member 8. For the purpose of operatively connecting the drive member 8 to the rod 9, there is provided a connecting element 12 slidably mounted on the rod 9 adjacent the rear end 11 thereof. This element shown in greater detail in Fig. 3 includes a fixed flange 13 and a pivoted member or drive leaf 14 having a slot 15 which receives in driving relation an arm 16 provided on the drive member 8.

Figure 7:
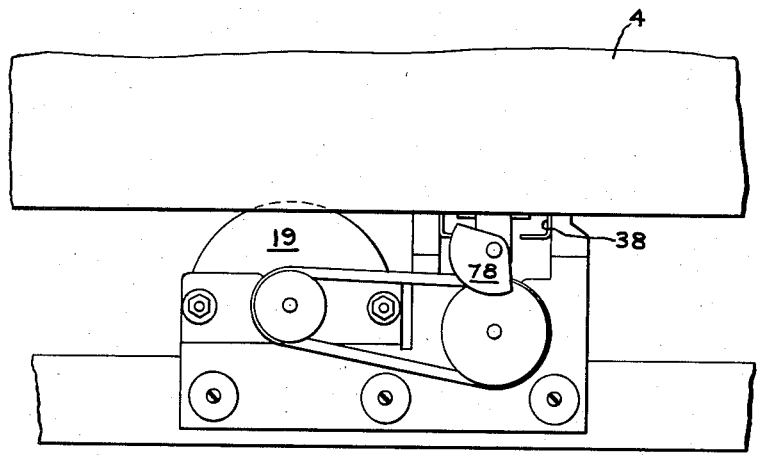
Fig. 7 is a front view of a portion of the cabinet shown in Fig. 1.

While the driving means for imparting a linear motion to the drive member 8 can be any of the various known types of linear motion devices, this driving means in the illustrated embodiment of the invention comprises a screw 18 extending parallel to the line of travel of the drawer 3 and on which the drive member 8 is threaded so that upon rotation of the screw 18 by means of the reversible motor 19 (Fig. 7), the drive member 8 will be caused to move linearly along a path parallel to the path of the drawer. A pin 20 running parallel to the screw 18 and extending through a hole 21 in the drive member arm 16 prevents rotation of the drive member 8 upon rotation of the screw 18 thereby maintaining the drive arm 16 in a position to be engaged by the slot 15 during the linear travel of the drive member 8.

In accordance with the present invention, the connecting member or element 12 and the rod 9 are so constructed and supported that under certain conditions of operation the connecting element 12 will become disengaged from the drive member 8 in order to protect the operator of the driving mechanism while under other conditions of operation a positive drive between the drive member 8 and the drawer is provided. The connecting member or element 12 is slidably arranged on the rod 9 to permit limited movement of the element 12 on the rear end 11 of the rod against the biasing action of either a front spring 23 and a rear spring 24. Longitudinally extending depressions or recesses 35 and 36 provided in the rod 9 ahead of and behind the connecting element 12 or more specifically within the portions of the rod 9 respectively encompassed by the springs 23 and 24 are adapted to receive either the arm 32 or the arm 31 of the drive leaf 14 upon compression of one or the other of two springs and thereby permit tilting or pivoting of the leaf 14 to disconnect the drive member 8 from the drawer. The strength of the springs 23 and 24 generally determine the throw out force or load at which the element 12 will move to a position in which it can become disconnected from the drive member 8 during opening or closing movement of the drawer. Also, as will be seen more clearly from Figs. 2 and 3 of the drawing, the front and rear walls of the slot 15 are respectively formed by the spaced arms 31 and 32 of the drive leaf 14 but that a downwardly extending portion 27 of the flange 13 also forms a portion of the rear wall of the slot 15 so that the arm 16 is in engagement with the fixed portion of the flange during part of the closing travel of the drawer 3.

For the purpose of supporting the inner end 11 of the rod 9 there is provided supporting and guide means comprising a two level channel-shaped guide member 38 supported on the cabinet 1 and having a pair of inwardly extending flange or track sections 39. A slide member 40 having a collar portion 41 mounted on the rod 9 and a pair of buttons or pads 42 adapted to slide on the track sections 39 is provided for supporting the rear end 11 of the rod on the guide member 38. A leaf spring 43 connected to this slide member 40 and bearing against the top wall 44 of the channel biases the pads 42 into engagement with their respective track sections. Preferably, the member 40 is slidably arranged on the rod 9 at one end of the connecting element 12 and between that element and one of the springs 23 and 24.

Figure 8:
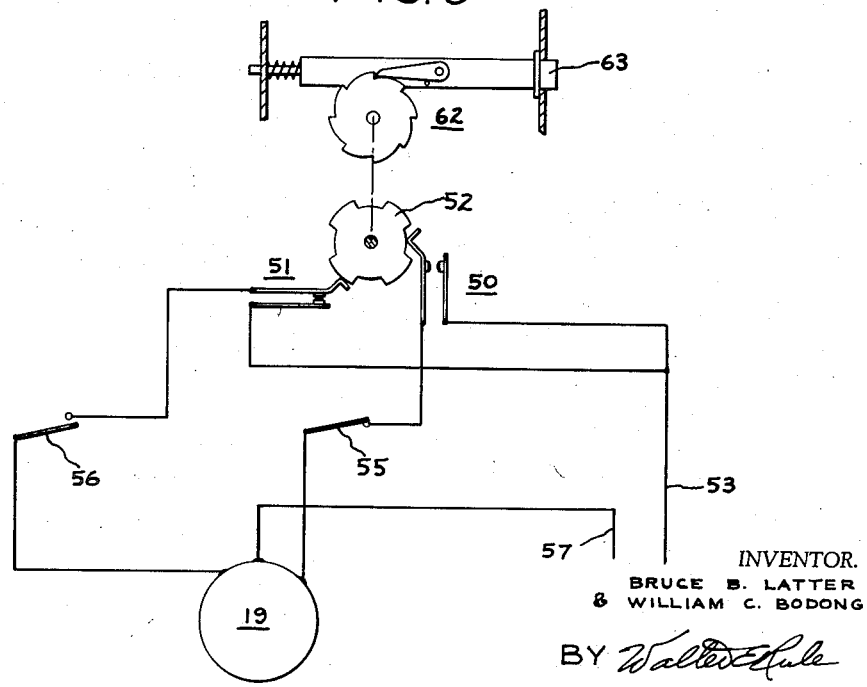
Fig. 8 is a diagrammatic view of a suitable control circuit for use in controlling the operation of the power mechanism of the present invention.

An electrical control circuit including suitable switch means for controlling the operation of the power mechanism is illustrated in Fig. 8 of the drawing. This circuit includes a pair of cam operated switches 50 and 51 and a cam 52 for operating the switches so that one is closed when the other is open. Switch 50 is connected to one of the supply lines 53 and to the reversing motor 19 through a limit switch 55. The other cam operated switch 51 for reversing the direction of rotation of the reversing motor 19 is connected to the supply line 53 and to the motor through a second limit switch 56 while the common lead from the motor 19 is connected to the supply line 57. It will be apparent from Fig. 2 of the drawing that the limit switches 55 and 56 are arranged so that one or the other opens the circuit by contact of the drive member 8 with the respective operating arms 60 and 61 when the drawer is either in its fully open or fully closed position. A pushbutton 63 and a pawl and detent arrangement 62 is provided for effecting rotation of the cam 52 to control the operation of the energizing switches 50 and 51.

Considering now the operation of the power mechanism, it should be noted that when the drawer is in the closed position as illustrated in Fig. 1, the various control switches are in their positions shown in Fig. 8. Control switch 50 which controls the circuit energizing the motor 19 to open the drawer is open while the limit switch 56 in the drawer closing circuit is also open, due to the contact of the drive member 8 with its switch operating member 61. With the drawer in its closed position, depression of the pushbutton 63, which may be located at any convenient position on the face of the cabinet 1, causes the cam member 52 to open switch 51 and close switch 50 thus completing the motor energizing circuit including the closed limit switch 55. Motor 19 then rotates the screw 18 in a direction which will cause the drive member 8 to move forwardly. The arm 16 on the drive member 8 contacts arm 32 on the drive leaf forming part of the connecting element 12 so that through the spring 23 and rod 9 the drawer is caused to move forwardly, the spring 23 having a strength such that it will resist the normal inertial and unlatching forces required for starting the drawer travel without permitting the connecting element 12 to move on the rod 9 to the position in which the arm 32 could engage the slot 35 in the rod 9. In normal operation of the drawer, that is in the absence of any overload conditions resulting for example from the presence of some obstruction preventing forward movement of the drawer 4, the opening travel of the drawer with the drive member 8 driving the drawer through the arm 32 of the drive leaf 14 will continue until the drive member 8 contacts the operating arm 60 on the limit switch 55 and opens the energizing circuit to the motor 19. However, in the event of any obstruction or malfunction of the mechanism increasing the load on the drive member 8 above a predetermined limit, the compression spring 23 will be compressed to the point at which the arm 32 will drop into the slot or recess 35 provided in the rod 9. This action, illustrated in Fig. 3 of the drawing, will permit the drive leaf 14 to tilt thereby providing a sloping rather than a substantially perpendicular slot wall or bearing surface on the arm 32 against which the arm 16 bears. With the drive leaf arm 32 rotated into the slot 35 the angle between the arm 32 and the drive member arm 16 is such that there is created an upward component of the force from the drive nut 8 sufficient to overcome the biasing action of the channel spring 43 so that the end 11 of the rod 9 is raised to the point illustrated in Fig. 4 of the drawing in which the drive member arm 16 rides under and disengages the drive leaf arm 32 thereby completely disconnecting the drive member from the drawer. While the motor 19 will continue to operate and transfer the drive member 8 to its forward position in which it ultimately de-energizes the motor through opening of the switch 55, the drawer will remain in its stalled position.

In order automatically to reconnect the power drive mechanism with the drawer, the forward or outer surface 70 of the arm 32 and the rear or outer surface 71 of the arm 31 are inclined or sloping so that with the drawer stalled in any position, contact of the drive member arm 16 with one or the other of these sloping surfaces 70 or 71 will cause the drive leaf to ride over the arm 16 against the biasing action of the spring 43 until the arm 16 again latches into or engages the slot 15.

The return of or closing operation of the drawer is effected by depressing the control button 63 so that switch 51 is closed whereby through the normally closed switch 56 the motor 19 is energized for reverse rotation. The motor will continue to operate until the drive member 8 trips the switch 56 to open the circuit.

The energy required to initiate movement of a drawer from a fully open position is considerably more than that ordinarily required to initiate movement of the same drawer from a closed to an open position due to the decreased supporting areas and greater frictional forces in the slide or guide arrangement when the door is fully extended. For that reason the connecting element 12 and the guide member 38 are so constructed that, during the initial movement of the drawer 3 from an open to a closed position, the element 12 cannot become disengaged or disconnected from the drive member 8. For this purpose, the guide track sections 39 are arranged in two levels or steps with the forward end 75 of the track sections being at a slightly lower level than the rear end 76 with the result that when the drawer is in the open position, the pads 42 riding on the lower step or section 75 of the track sections 39 in which position the arm 16 on the drive member 8 contacts the portion 77 of the fixed flange 13 during initial rearward travel of the drawer. In other words, unlatching of the connecting element 12 by tilting of the pivoted leaf 14 cannot take place while the elements 12 is riding on the lower step 75 since the driving force is transmitted through the flange portion 27 rather than the leaf 14 and spring 24. Thus, even though the spring 24 should become completely compressed, so that arm 31 of the drive leaf 14 moves to a position where it overlies the depression 36, the disconnecting action will not take place, the arm 16 cannot cause the leaf arm 31 to tilt into the depression 36.

Since the greatest likelihood of injury to an operator of a power operated drawer is during the time that the drawer is approaching its closed position, rear track portion 76 is arranged to move the connecting element 12 away from the drive member 8 during this portion of the drawer travel a distance such that the arm 16 will contact only the drive leaf arm 31 as is shown in Figure 9 and not the fixed flange 27. The driving force is then transmitted through the drive leaf arm 31. Spring 24 is strong enough to prevent movement of the connecting element 12 to a point where the drive leaf arm 31 can pivot into the depression 36 under normal load conditions but is sufficiently weak that, if the operator's hand, fo rexample, is caught between the closing drawer and the cabinet face, the drive leaf 28 can pivot into depression and disconnect the drive member 8 from the drawer.

In the event of power failure or malfunction of the power mechanism, means are also provided to permit manual operation of the drawer. For this purpose, the rod 9 is adapted for limited rotation by means of a control knob 78 affixed to the rod 9 adjacent the front wall of the drawer 3, and the disconnect element 12 by use of slot 79 in the element and a pin 80 in the slot is arranged to rotate with the rod 9. A quarter turn of the rod 9 by means of the knob 78 causes the control element 12 to rotate through a 90° angle and become completely disengaged from the drive member arm 16. The drawer can then be manually opened or closed by means of the handle 5. Upon return of the rod 9 to its normal position in which the connecting element 12 is in a position to engage the arm 16 on the drive member 8, the sloping surfaces 70 and 71 on the drive leaf 28 provide means for reconnection of the power means movement of either the drawer or of the drive member 8 to a latching position relative to one another.

From the above description it will be seen that there has been provided in accordance with the present invention, a drawer power actuating mechanism including a safety device limiting the operating forces to preset limits, the safety load limit being lower for operation of the unlatching or throw out means during that closing stage of the drawer stroke where it is most desirable. Further it will be seen that even after disconnecting operation of the safety mechanism, the driving means including the motor will continue to operate until the drive member moves to its limited stop position at which point the motor is deenergized thus resetting the driving means for the next operation thereof.

While there has been shown and described a particular embodiment of the present invention, it will be seen that the invention is not limited to this particular form and it is therefore intended by the appended claims to cover all modifications as fall within the spirit and scope of the invention.

What we claim as new and desire to secure by Letters Patent of the United States is:

1. In a drive mechanism for opening and closing a drawer, a drive member, driving means for moving said drive member in a path parallel to the line of travel of said drawer, driven means comprising a rod having one end connected to said drawer, a connecting element slidably mounted on said rod adjacent the other end thereof for engaging said drive member and adapted in first position on said rod to positively engage said drive member and in second position to disengage said drive member, and spring means for biasing said connecting member to said first position against the driving force of said drive member under normal drawer operating conditions and for permitting said connecting member to move to said second position when the driving force of said drive member exceeds a predetermined value.

2. In a drive mechanism for opening and closing a drawer, a drive member, driving means for moving said drive member in a path parallel to the line of travel of said drawer, driven means comprising a rod having one end pivotally connected to said drawer, a safety-release connecting element slidably mounted on said rod adjacent the other end thereof and including a pivoted means for engaging said drive member, said pivoted means being adapted in first position of said connecting element on said rod to positively engage said drive member and in second position of said connecting element to disengage said drive member, and spring means for biasing said connecting member to said first position against the driving force of said drive member under normal drawer operating conditions and for permitting said connecting member to move to said second position when the driving force of said drive member exceeds a predetermined value.

3. In a drive mechanism for opening and closing a drawer, a drive member, driving means for moving said drive member in a path parallel to the line of travel of said drawer, driven means comprising a rod having one end pivotally connected to said drawer, a connecting element slidably mounted on said rod adjacent the other end thereof and having a slot therein, said drive member including an arm extending into said slot, and means supporting said other end of said rod for changing the position of said arm in said slot at different positions of said drawer between a first position in which said connecting element is positively engaged by said drive member and a second position in which said connecting element will disengage said drive member at a predetermined load limit, means for biasing said connecting member to said first position against the driving force of said drive member under normal drawer operating conditions and for permitting said connecting member to move to said second position when the driving force of said drive member exceeds a predetermined value.

4. In a drive mechanism for opening and closing a drawer, a drive member, driving means for moving said drive member in a path parallel to the line of travel of said drawer, driven means comprising a rod having one end connected to said drawer, a connecting element slidably mounted on said rod adjacent the other end thereof for engaging said drive member, said connecting element including means for disengaging said drive member, a guide, said connecting element including means slidably arranged on said guide for supporting said connecting element, said guide including a first section arranged to position said connecting member in interlocking relation with said drive member and a second section arranged to position said connecting member in position to disengage said drive member when the driving force of said driving means exceeds a predetermined value.

5. In a drive mechanism for opening and closing a drawer, a drive member having an arm thereon, driving means for moving said drive member in a path parallel to the line of travel of said drawer, driven means including a rod having one end connected to said drawer and a connecting element slidably mounted on said rod adjacent the other end thereof and having a slot therein for receiving and engaging said drive member arm, a guide for slidably supporting said connecting element in two positions relative to said arm whereby said arm extends into said slot a greater distance when said drawer is open than when said drawer is partially closed, said slot including a side wall having a fixed portion which is engaged by said arm only when said drawer is fully open and a pivoting portion engaged by said arm when said drawer is moved to partially closed position and adapted upon pivoting thereof to disengage said arm, said driven means including means permitting pivoting of said pivoting portion when the driving force of said arm on said pivoting portion exceeds a predetermined value during closing of said drawer.

6. In a drive mechanism for opening and closing a drawer, a drive member including a drive arm, driving means for moving said drive member in a path parallel to the line of travel of said drawer, driven means comprising a rod having one end pivotally connected to said drawer, a connecting element slidably mounted on said rod adjacent the other end thereof and having a flange including slot therein for engaging said drive member arm, a fixed guide, said connecting element including means slidably arranged on said guide for supporting said connecting element, said guide including a first section arranged to position said connecting member in interlocking relation with said drive member and a second section arranged to position said connecting member in position to disengage said drive member when the driving force of said driving means exceeds a predetermined value, and means for manually rotating said rod to disengage said slot from said arm to permit manual operation of said drawer.

7. In combination, a cabinet, a drawer slidably supported by said cabinet for movement between a storage position within said cabinet and an access position, means for moving said drawer from one to the other of said positions comprising a drive screw rotatably mounted on said cabinet in parallel relation with the direction of movement of said drawer, a drive motor operatively connected to said screw for rotation thereof in either direction, a drive nut in threaded engagement with said screw, means for preventing rotation of said nut upon rotation of said screw, an arm on said drive screw extending radially outwardly therefrom, a rod having one end pivotally connected to the front end of said drawer and the other end extending into said cabinet adjacent to and substantially parallel to said drive screw, an element slidably supported on said other end of said rod for engaging said drive nut arm, said element including a fixed flange, a drive leaf pivotally connected to said flange and including spaced arms including portions extending outwardly from said flange and defining a drive leaf slot for receiving said drive nut arm, said spaced arms including bearing portions normally contacting the surface of said rod to prevent pivotal movement of said drive leaf under the normal driving forces of said drive arm, said rod having spaced depressions therein in line with the drive leaf bearing portions, springs carried by said rod on opposite sides of said element for maintaining said element and drive leaf between said depressions under normal drive conditions and for permitting said element under overload conditions to move along said rod to a position in which one of said bearing portions drops into one of said depressions to permit said drive leaf to pivot and disengage said drive nut arm, means including a guide member affixed to said cabinet and a slide member on said rod including slides engaging said guide for supporting said element in operative relationship with said drive nut arm, said slide member having spring means attached thereto and engaging said guide member to bias said element towards said drive nut arm, and manually operated means for rotating said element from its operative position engaging said drive nut arm to a position in which said drive nut becomes disengaged from said arm to permit manual operation of said drawer, said arms on said drive leaf having inclined outer edges to permit said leaf to ride over said drive nut arm for reengagement with said drive leaf when said element and drive nut arm are returned to their operative positions relative to one another.

8. In combination, a cabinet, a drawer slidably supported by said cabinet for movement between a storage position within said cabinet and access position partially outside said cabinet, means for moving said drawer from one to the other of said positions comprising a drive screw rotatably mounted on said cabinet in parallel relation with the direction of movement of said drawer, a drive motor operatively connected to said screw for rotation thereof in either direction, a drive nut in threaded engagement with said screw, means for preventing rotation of said nut upon rotation of said screw, an arm on said drive screw extending radially outwardly therefrom, a rod having one end pivotally connected to the front end of said drawer and the other end extending into said cabinet adjacent to and substantially parallel to said drive screw, an element slidably supported on said other end of said rod for engaging said drive nut arm, said element including a fixed flange, a drive leaf pivotally connected to said flange and including spaced front and rear arms each including portions extending outwardly from said flange to define a drive leaf slot for receiving said drive nut arm, said spaced drive leaf arms including bearing portions normally contacting the surface of said rod to prevent pivotal movement of said drive leaf under the normal driving forces of said drive arm, said rod having spaced depressions therein in line with said drive leaf bearing portions, springs carried by said rod on opposite sides of said element for maintaining said element and drive leaf between said depressions under normal drive conditions and for permitting said element under overload conditions to move along said rod to a position in which one of said bearing portions drops into one of said depressions to permit said drive leaf to pivot and disengage said drive nut arm, said flange providing a surface overlapping a portion of said drive leaf rear arms, means including a guide member affixed to said cabinet and a slide member on said rod for slidably engaging said guide to position said element relative to said drive nut arm, in a first position in which said drive nut arm can engage said overlapping flange surface when said drawer is in its access position and a second position in which said drive nut arm can engage only said rear arm during movement of said drawer to its storage position, said slide member having spring means attached thereto and engaging said guide member to bias said element towards said drive nut arm.

9. In combination, a cabinet, a drawer slidably supported by said cabinet for movement between a closed position within said cabinet and an open position, drive means for moving said drawer from one to the other of said positions comprising a drive screw rotatably mounted on said cabinet in parallel relation with the direction of movement of said drawer, a drive nut in threaded engagement with said screw, means for preventing rotation of said nut upon rotation of said screw, an arm on said drive screw extending radially outwardly therefrom, a rod having one end connected to the front end of said drawer and the other end extending into said cabinet adjacent to and substantially parallel to the drive screw, a connecting element slidably supported on said other end of said rod, said element including a flange extending towards said arm, a drive leaf pivotally connected to said flange and including spaced rear and front arms respectively including portions extending outwardly from said flange behind and in front of said drive nut arm, said spaced drive leaf arms including bearing portions extending longitudinally of said rod for normally contacting the surface of said rod to prevent pivotal movement of said drive leaf under the normal driving forces of said drive arm, said rod having spaced slots therein in line with said drive leaf bearing portions and springs carried by said rod on opposite sides of said element for maintaining said element and drive leaf between said slots under normal drive conditions and for permitting said element to move along said rod to a position in which one of said bearing portions drops into a slot and causes said drive leaf to pivot and disengage said drive nut arm, means including a guide member affixed to said cabinet for supporting said element in operative relationship with said drive nut arm.

References Cited in the file of this patent

UNITED STATES PATENTS

| | | |
|---|---|---|
| 2,174,582 | Hudon | Oct. 3, 1939 |
| 2,602,664 | Matchett | July 8, 1952 |

FOREIGN PATENTS

| | | |
|---|---|---|
| 452,114 | Great Britain | Aug. 14, 1936 |
| 507,803 | Great Britain | June 21, 1939 |